United States Patent [19]

Hofmann-Cerfontaine

[11] 4,394,654

[45] Jul. 19, 1983

[54] IDENTIFICATION DEVICE

[75] Inventor: Hellmut W. Hofmann-Cerfontaine, Nuremberg, Fed. Rep. of Germany

[73] Assignee: Hannsheinz Porst, Nuremberg, Fed. Rep. of Germany

[21] Appl. No.: 255,192

[22] Filed: Apr. 17, 1981

[30] Foreign Application Priority Data

Apr. 17, 1980 [DE] Fed. Rep. of Germany ....... 3014882

[51] Int. Cl.³ .................. G06K 5/00; G08B 13/06; H04Q 1/00
[52] U.S. Cl. .................. 340/825.34; 235/380
[58] Field of Search .................. 235/380, 375; 340/149 A, 825.34

[56] References Cited

U.S. PATENT DOCUMENTS

| | | | |
|---|---|---|---|
| 4,053,735 | 10/1977 | Foudos . | |
| 4,102,493 | 7/1978 | Moreno | 235/488 |
| 4,103,289 | 7/1978 | Kolber | 340/149 A |
| 4,208,575 | 6/1980 | Haltof | 340/825.34 |
| 4,236,068 | 11/1980 | Walton | 235/380 |
| 4,277,837 | 7/1981 | Stuckert | 235/380 |

FOREIGN PATENT DOCUMENTS 2815448 11/1978 Fed. Rep. of Germany .

OTHER PUBLICATIONS

"Wrist Worn Terminal", C. P. Ludeman, et al., *IBM Technical Disclosure Bulletin*, vol. 15, No. 11, Apr. 1973, pp. 3350, 3351.

IBM Technical Disclosure Bulletin, vol. 23, No. 2, Jul. 1980, pp. 676, 677, "Machine-Readable Personal Identification Module", M. J. Martino.

*Primary Examiner*—Donald J. Yusko
*Attorney, Agent, or Firm*—William D. Hall

[57] ABSTRACT

A novel identification device permits its holder to prove his authority as holder thereof so as to largely prevent its abusive use. The said identification device consists of a handy small housing (1) comprising permanent storage means (10) with an alphanumerical character string forming a code stored therein, further input means, a word register (9) for entering an alphanumerical character string by means of the input means, a comparator (11) having connected to its inputs the permanent storage means (10) and the word register (9), and display means connected to the comparator (11) for indicating the existing or missing conformity of the two character strings as determined by the comparator. A first time function element equipped with interlocking means which at the end of a predetermined first period of time supplies an interlocking signal preventing the conformity, if existing, to be displayed, may serve to limit a period of validity of the identification device. The word register (9) may be coupled also to a certain time function element which serves to erase the content of the word register at the end of a second predetermined, relatively short period of time so as to prevent any abuse which may otherwise result from the fact that the display of an existing conformity is retained for an unlimited period of time.

12 Claims, 3 Drawing Figures

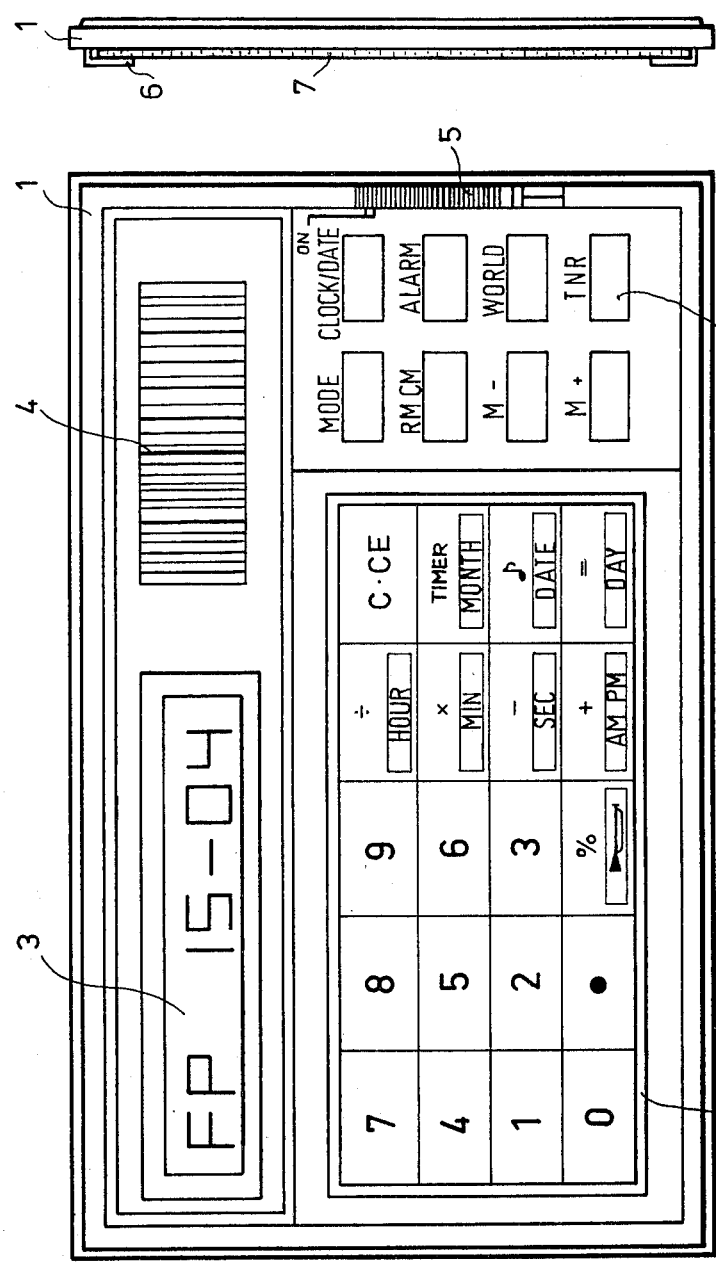

IDENTIFICATION DEVICE

In business life, it is common practice to use identification devices of different types to demonstrate the holder's entitlement to different services. Code cards of savings bank books, EC cards and last but not least the steadily increasing number of credit cards are examples of such identification devices. All these identification devices offer the disadvantage that abusive use may be made by third parties to the detriment of their holders because as a rule one generally assumes that the person having possession of the card is also its authorized holder. Keeping control of the use of the cards by means of lists of lost cards, etc., is not only complicated but also insufficient because in many cases the holder does not become aware of the loss quick enough to notify it immediately to the issuing agency so as to prevent heavy losses as a result of the possible abusive use of the card.

Now, it is the object of the present invention to provide an identification device which restricts its use with great security to its lawful holder.

According to the invention, this problem is solved by an arrangement in which permanent storage means in which an alphanumerical character string forming a code is stored, and a word register into which an alphanumerical character string can be entered by means of input means, are connected to a comparator which supplies to a display device a control signal indicating that conformity between the two character strings is either present or missing.

When the alphanumerical character string stored in the permanent storage means of the identification device of the invention is known only to the lawful holder of the device, he will be the only person who can enter the same alphanumerical character string into the word register using the input means and, as a result thereof, also the only one who can cause the comparator to supply a control signal representative of the two character strings to the display means so that the latter can indicate the existence of conformity between the two strings. Accordingly, the holder of the identification device can at any time identify himself as the lawful holder by entering the correct character string which is known to him alone. This proof can be furnished at any time when the holder of the identification device calls for the services to which he is entitled by the device. The fact that the number of digits of the character string can be selected at desire offers an extreme degree of protection against any abusive use. When the number of digits of the character string used is eight and the characters are limited to the figures 1 to 0, already 100 million different possibilities are obtained. When a sedecimal method of representation is selected, eight digits give more than 4 billion different character strings.

In practice, such an identification device may have a form similar to that of small pocket computer, which means that it may be arranged in a small housing comprising both the input means and the display means. Also, it may be conceived either as a separate unit or—just as certain pocket computers—incorporated into other equipment, such as wrist watches, pens, and the like.

In a preferred embodiment of the invention, the identification device is combined with a pocket computer in a manner such that the input means and the display means are directly formed by the keyboard and the display, respectively, of the pocket computer. Pocket computers of this type, which anyway often have the format of a credit card and a thickness only little greater than such a card, have already found broad distribution and may be provided without great expense with the additional means which will give the pocket computer the properties permitting its use as an identification device.

In cases where it is desirable—just as in the case of credit cards—to limit the period of validity of the identification device, a time function element with interlocking means may be provided for supplying at the end of the pre-determined period of time a signal which prevents any given conformity from being displayed. In this case, the identification device becomes useless at the end of a given period of time because it does no longer, and under no circumstances, produce a signal indicative of the existence of the required authority. The identification device could in this case be returned to the issuing agency and the latter could be the necessary manipulations remove the interlocked condition and reset the time function element.

The time function element may be composed simply of an oscillator and a counter to which the oscillations of the oscillator are supplied, and whose position varies in proportion to the cycles of the oscillations and which finally serves to actuate the interlocking means in response to its counter position. For instance, the oscillator and the counter may be designed in a manner such that the counter, starting from a zero position, will reach its final position at which the interlocking signal is released, exactly at the end of one year, whereafter the interlocking signal is maintained regardless of the counter position. An oscillator and a counter of this type are part of all electronic watches with date display so that the identification device of the invention can be combined also with such electronic watches in which case the interlocking means may simply comprise a date storage means and a comparator connected to the said date storage means and a register of the date display means, to supply the interlocking signal when certain pre-determined conditions are fulfilled, in particular when conformity exists between the dates present in the date storage means and in the register. In order to prevent any abusive use in such a case, the design of the watch must be such that the current date can be set only by the agency issuing the identification device.

In order to supply a display which confirms the authority of the holder, the display means may be coupled via a gate circuit to a character generator for generating a character string indicating the existence of conformity, and the gate circuit may respond to the control signal and the interlocking signal, if any. Instead of the visual display means, or in addition to the latter, an acoustic signal generator may also be provided. This is possible in particular in cases where the identification device is integrated into an electronic watch equipped with alarm means, in which case the signal generator of the alarm means could be activated to indicate the exisrtence of the required authority.

In order to prevent that the display indicating that the necessary authority exists is maintained for an extended period of time so that unauthorized persons could get into possession of an identification device with such a display, a further improvement of the invention provides that the word register has coupled to it a time function element which erases the content of the word register at the end of a pre-determined period of time.

This period of time may be short enough, for instance one or two minutes, to force the user to enter the character string which is known to him alone and, thus, to release the confirmative signal every time he is required to prove his authority.

The identification device of the invention may—similar to credit cards or the like—be directly provided with a code permitting the service supplied to be registered and accounted for. To this end, machine-readable characters may be provided, for instance in the form of the bar code which is so widely used today. But it is of course also possible to use the identification device in combination with a credit card by giving the identification device and the credit card the same code, for instance the same account number, which must of course differ from the character string known to the lawful holder. If used in combination with a credit card, the identification device of the invention may have a housing provided with means for accommodating a credit card.

The invention will be described hereafter in closer detail by way of one embodiment shown in the drawing. The features apparent from the specification and the drawing may be used in other embodiments of the invention either separately or in any desired combination. In the drawing:

FIG. 1 shows an enlarged top view of an identification device of the invention, in the form of a pocket computer with integrated watch;

FIG. 2 shows a side elevation of the identification device of FIG. 1; and

Figure 3:
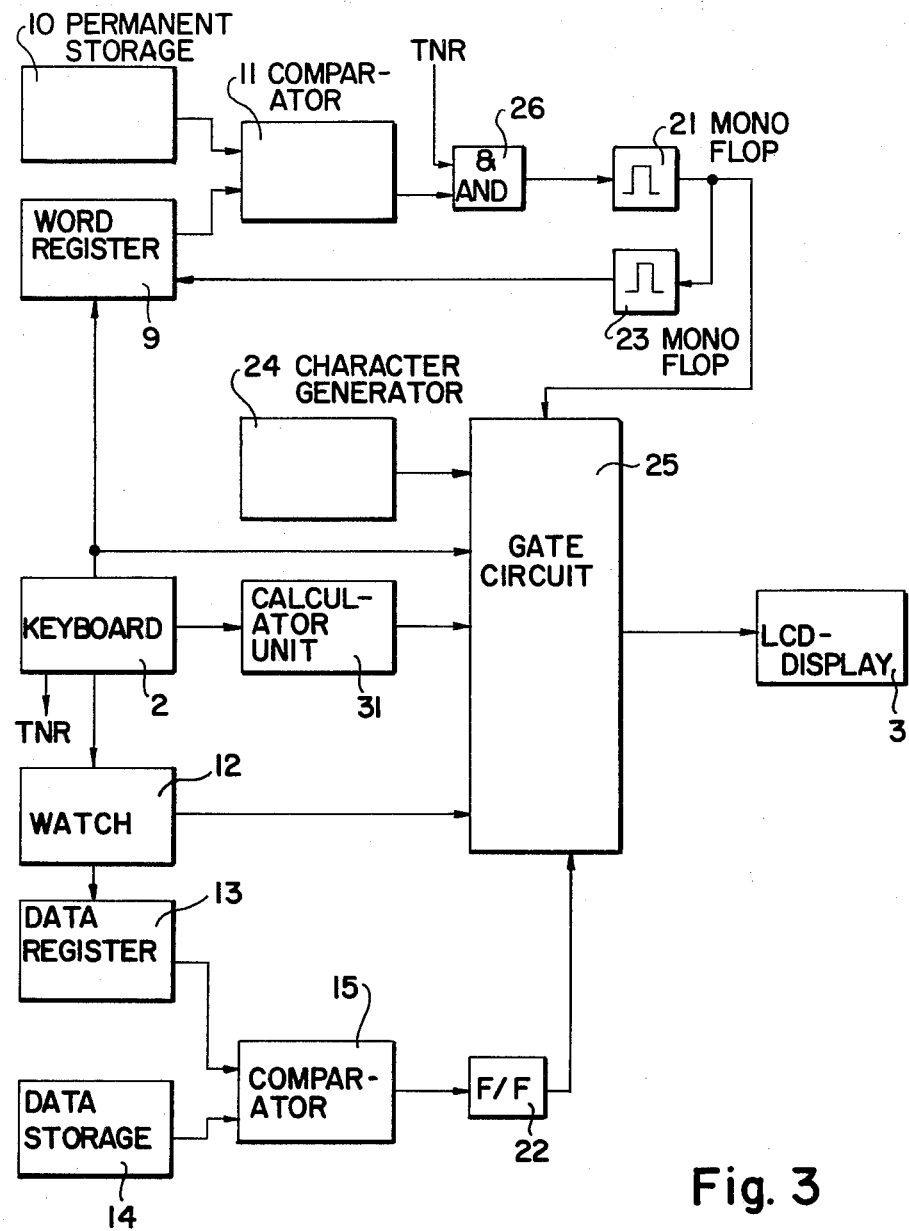
FIG. 3 shows a block diagram of the electronic components of the identification device shown in FIG. 1, to the extent these are necessary to understand the invention.

The embodiment shown in FIG. 1 is that of a combination of a watch and a pocket computer of the size of a credit card. Pocket computers of this type are offered on the market in many different forms. The rectangular, very flat housing 1 is provided on its front with a keyboard 2 comprising a number of conventional character and function keys. Above the keyboard 2, there is arranged an LCD display 3 and a code array 4 in the form of a machine-readable bar code. At the right edge of the housing 1—as viewed in FIG. 1—an on/off-switch 5 is provided. Fastened to the rear of the housing 1 is a frame constituted by integrally formed angular rails 6. This frame is open on one narrow side of the housing 1 and serves to accommodate a credit card 7. The legs of the angular rails 6 extending in parallel to the rear face of the housing 1 are slightly resilient so that the credit card 7 is safely retained by them by friction contact.

To this point, only the machine-readable code 4, the angular rails 6 serving to accommodate the credit card 7 and in particular an additional key 8 in the keyboard 2 designated TNR indicate that the pocket computer with integrated watch described above may be used also as identification device. Likewise, minor changes only had to be applied to the circuit arrangement of the pocket computer with integrated watch to make it suited for the additional function of an identification device.

As can be seen in FIG. 3, the circuit arrangement comprises a word register 9 coupled to the keyboard 2. The character capacity of the word register 9 is identical to that of the LCD display 3. In the example shown, this capacity is limited to eight characters. All characters entered via the keyboard 2 are registered in the word register 9. The word register 9 coacts with a permanent storage 10 which contains a character string which has been entered therein for permanent storage by the agency issuing the identification device, which cannot be changed by the user of the identification device, but which is known to the authorized holder. The word register 9 and the permanent storage 10 are connected to a comparator 11 which supplies a control signal indicative of the conformity of the two character strings to an AND gate 26 when the character strings in the word register and in the permanent storage are identical. Normally, such conformity will not exist, the more so as the word register 9 will be loaded each time the keyboard is used for entering operands or for setting the time. But when the character string conforming to that contained in the permanent storage 10 is entered into the word register and when simultaneously the key 8 of the keyboard 2 is actuated, the AND gate 26 is not only supplied with the control signal of the comparator 11, but simultaneously with the signal TNR, and as a result thereof the output signal of the AND gate 26 will actuate a monoflop 21 to generate a control pulse and supply it to a gate circuit 25 to cause the latter to establish, for the length of time of the control pulse, a connection between a character generator 24 and the LCD display 3 which as a result thereof will give the display established by the character generator 24 and indicative of the conformity between the two character strings, thus identifying the holder of the identification device as the authorized holder thereof. When, in contrast, no control signal is supplied by the comparator 11, one of the two signals needed for actuating the monoflop 21 will be missing at the corresponding input of the AND gate 26 when the TNR key 8 is operated, so that the character generator 24 will not be connected to the LCD display 3. Rather, the normal function of the gate circuit will be maintained, which means that the figures entered through the keyboard 2 are displayed by the LCD display 3 via the calculator unit 31 and gate 25.

A conformity display described above is based on the precondition that the gate circuit 25 is supplied with an additional release signal supplied by a flipflop 22 connected to the watch 12. The flipflop 22 is connected to the output of a comparator 15 which has connected to its inputs a date register 13 and a date storage 14. This date storage 14 may be used by the person issuing the identification device for entering a pre-determined expiration data on which the identification device is to become invalid. In contrast, the date register 13 is connected to the watch 12 in a manner such that it always displays the current date. The latter is also set to the correct value before the identification device is issued, and is thereafter continuously updated by the watch without any interference being possible on the user's part. Other setting maneuvers are restricted to settings of the time of the day, alarm times, etc. Further, there exists one condition of the flipflop 22 in which the gate circuit 25 is supplied with a preparation signal which permits the gate circuit to respond to the output signal of the monoflop 21. But when the current date in the date register 13 reaches the date contained in the date storage 14, the comparator 15 registers conformity between the dates and supplies to the flipflop 22 an output signal which changes the condition of the flipflop, thereby changing in a permanent manner the signal supplied by the flipflop 22 to the gate circuit 25 so that now the gate circuit can no longer respond to the output signal of the monoflop 21. This ensures that after the expiration date stored in the date storage 14, no signal can be supplied by the identification device that could identify the user as being entitled to the services in question.

The output of the monoflop 21 is connected to another monoflop 23 which responds to the trailing edge of the control pulse supplied by the monoflop 21 to emit a clear pulse which is supplied to the word register 9. This excludes any possible erroneous retention of the correct character string in the word register and, thus, any resulting abusive use of the identification device. In practical use, it should be sufficient for furnishing evidence of the authority, if the signal indicating the existence of the authority is maintained for a period of one to two minutes. On the other hand, such a reduced display time warrants that the character string known to the holder alone must be entered anew every time the identification device is to be presented.

The character generator 24 should supply a code which cannot be generated in any other manner. If, for instance, the keyboard of a computer enables only numerical characters to be entered, the character generator could generate an alpha character. It is also possible to combine characters generated by the character generator with other characters available in the identification device, for instance an alphastring generated by the character generator with the current date. In this case, even a flashing display could be imagined for better differentiation from the normal date display.

It also goes without saying that the circuit arrangement shown in FIG. 3 is only one of many possible circuit arrangements that may be realized to perform the functions described above. Likewise, the components shown in FIG. 3, or similar components, need not necessarily take the form of discreet circuit elements or circuit units, but may also be realized by the programme of a microprocessor of the type normally used in pocket computers for carrying out the different computing operations. The programme could in this case be recalled by the TNR key, and the permanent storage 10 and the data storage 14 could be formed by areas in the permanent storage containing the operating programme of the microprocessor. In this case, a RePROM should be used as permanent storage to enable both the permanently stored alphanumerical character string and the stored expiration date to be changed. It also goes without saying that the identification device need not necessarily be provided only with a bar code 4 representing an identification number identical to the identification number of a credit card 7. Rather, the computer might be provided also at its back with impressed marks of the type which are commonly used on credit cards so that the computer could be directly used in the same manner as a credit card. Also, all the entries normally contained on a credit card could be provided in the form of a machine-readable code so that the invoices could be typed out electronically, instead of mechanically.

What we claim is:

1. An identification device characterized in that permanent storage means in which an alphanumerical character string forming a code is stored, and a word register into which an alphanumerical character string can be entered by means of input means, are connected to a comparator which supplies to a display device a control signal indicating that conformity between the two character strings is either present or missing; and further characterized by a time function element with interlocking means which, at the end of a pre-determined expiration period of time, supplies an interlocking signal which prevents an existing conformity from being displayed, the expiration period defining the validation during which the device permits indication of the presence or absence of conformity.

2. An identification device in accordance with claim 1, characterized in that the input means and the display means are formed by the keyboard (2) and the display (3), respectively, of a pocket computer.

3. An identification device in accordance with claim 1, characterized in that the identification device further comprises an acoustic signal generator means for indicating the presence of conformity.

4. An identification device in accordance with claim 1, characterized in that the time function element comprises an oscillator and a counter to which the oscillations of the oscillator are supplied, whose position varies in proportion to the cycles of the oscillation and which finally serves to actuate the interlocking means in response to its position.

5. An identification device in accordance with claim 4, characterized in that the oscillator and the counter are components of an electronic watch (12) with date display and that the interlocking means comprises a date storage (14) and a comparator (15) connected to the date storage and a register (13) of the date display, which comparator supplies the interlocking signal when the pre-determined conditions are fulfilled.

6. An identification device in accordance with claim 1, chracterized in that the display means is coupled via a gate circuit (25) to a character generator (24) for a character string indicative of the existence of conformity and that the gate circuit (25) responds to the control signal and the interlocking signal, if any.

7. An identification device in accordance with claim 1, characterized in that the word register (9) is coupled to a time function element which erases the contents of the word register at the end of a pre-determined period of time.

8. An identification device in accordance with claim 1, characterized in that it is preferably provided with a machine-readable code.

9. An identification device in accordance with claim 1, characterized by a housing (1) designed for accommodation of a credit card (7).

10. An identification device comprising:
storage means for permanently storing a predefined string of alphanumerical characters therein, the predefined string representing an identification code;
a word register and keyboard means for entering alphanumerical characters in sequence into the word register as an entered string;
comparator means for supplying a control signal when the entered string in the word register conforms with the predefined string in the storage means;
means for indicating the presence or absence of conformity between the entered string and the predetermined string;
time function element means for providing an interlocking signal at the end of a pre-determined expiration period; and
interlock gate means, connected to the conformity indications means and to the time function element means, for inhibiting the conformity indicating means in response to an interlocking signal from the time function element means;

the expiration period defining the validation time during which the device permits indication of the presence or absence of conformity.

11. An identification device as in claim 10 further comprising:
an actuatable TNR key on the keyboard means wherein the key, when actuated, provides an enable signal; and
an AND gate, interposed between the comparator means and display means, the AND gate having the control signal from the comparator means as one input and the enable signal from the key as another input.

12. An identification device as in claim 11 further comprising:
means, connected to receive the output of the AND gate, for clearing the word register at a predefined time after the AND date provides an output signal.

* * * * *